(12) United States Patent
Lewis et al.

(10) Patent No.: US 9,476,129 B2
(45) Date of Patent: *Oct. 25, 2016

(54) SOLAR FUELS GENERATOR

(71) Applicant: California Institute of Technology, Pasadena, CA (US)

(72) Inventors: Nathan S. Lewis, La Canada Flintridge, CA (US); Joshua M. Spurgeon, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 644 days.

This patent is subject to a terminal disclaimer.

(21) Appl. No.: 13/855,515

(22) Filed: Apr. 2, 2013

(65) Prior Publication Data

US 2013/0256147 A1 Oct. 3, 2013

Related U.S. Application Data

(60) Provisional application No. 61/619,316, filed on Apr. 2, 2012.

(51) Int. Cl.
*C25B 1/00* (2006.01)
*C25B 9/08* (2006.01)

(52) U.S. Cl.
CPC *C25B 9/08* (2013.01); *C25B 1/003* (2013.01)

(58) Field of Classification Search
CPC .................................. C25B 9/08; C25B 1/003
USPC .................................. 205/340; 136/243–265
See application file for complete search history.

(56) References Cited

U.S. PATENT DOCUMENTS

| 4,215,182 A | 7/1980 | Ang et al. |
| 4,358,676 A | 11/1982 | Childs et al. |
| 5,314,569 A | 5/1994 | Pribat |
| 5,336,558 A | 8/1994 | Debe |
| 5,352,651 A | 10/1994 | Debe |
| 5,468,699 A | 11/1995 | Zhang et al. |

(Continued)

FOREIGN PATENT DOCUMENTS

| CN | 1669920 A | 9/2005 |
| CN | 1808688 A | 7/2006 |

(Continued)

OTHER PUBLICATIONS

Kim, Dong Seok, International Search Report and Written Opinion, PCT/US2013/035026, Korean Intellectual Property Office, Date of Mailing: Jul. 4, 2013.

(Continued)

*Primary Examiner* — Keith Hendricks
*Assistant Examiner* — Colleen M Raphael
(74) *Attorney, Agent, or Firm* — Joseph R. Baker, Jr.; Gavrilovich, Dodd & Lindsey LLP

(57) ABSTRACT

The solar fuels generator includes an ionically conductive separator between a gaseous first phase and a second phase. A photoanode uses one or more components of the first phase to generate cations during operation of the solar fuels generator. A cation conduit is positioned provides a pathway along which the cations travel from the photoanode to the separator. The separator conducts the cations. A second solid cation conduit conducts the cations from the separator to a photocathode.

20 Claims, 6 Drawing Sheets

(56) References Cited

U.S. PATENT DOCUMENTS

| | | | |
|---|---|---|---|
| 5,976,957 | A | 11/1999 | Westwater et al. |
| 6,306,734 | B1 | 10/2001 | Givargizov |
| 6,649,824 | B1 | 11/2003 | Den |
| 7,057,881 | B2 | 6/2006 | Chew et al. |
| 7,105,428 | B2 | 9/2006 | Pan et al. |
| 7,109,517 | B2 | 9/2006 | Zaidi |
| 7,116,546 | B2 | 10/2006 | Chew |
| 7,148,417 | B1 | 12/2006 | Landis |
| 7,238,594 | B2 | 7/2007 | Fenash et al. |
| 7,253,017 | B1 | 8/2007 | Roscheisen et al. |
| 7,253,442 | B2 | 8/2007 | Huang |
| 7,259,324 | B2 | 8/2007 | Zeira |
| 7,309,620 | B2 | 12/2007 | Fonash et al. |
| 7,335,259 | B2 | 2/2008 | Hanrath et al. |
| 7,560,366 | B1 | 7/2009 | Romano et al. |
| 7,666,708 | B2 | 2/2010 | Lieber et al. |
| 7,998,788 | B2 | 8/2011 | Guha et al. |
| 8,105,474 | B2 | 1/2012 | Fan |
| 2002/0172820 | A1 | 11/2002 | Majumdar et al. |
| 2004/0213307 | A1 | 10/2004 | Lieber et al. |
| 2005/0009224 | A1 | 1/2005 | Yang et al. |
| 2005/0205128 | A1 | 9/2005 | Deng et al. |
| 2005/0211290 | A1* | 9/2005 | Deng .................. C25B 1/003 136/252 |
| 2005/0227391 | A1 | 10/2005 | Jin et al. |
| 2005/0253138 | A1 | 11/2005 | Choi et al. |
| 2005/0279274 | A1 | 12/2005 | Niu et al. |
| 2006/0118791 | A1 | 6/2006 | Leu |
| 2006/0207647 | A1 | 9/2006 | Tsakalakos et al. |
| 2007/0032076 | A1 | 2/2007 | Lee et al. |
| 2007/0119706 | A1* | 5/2007 | McNulty .............. C25B 1/003 204/252 |
| 2007/0122313 | A1 | 5/2007 | Li et al. |
| 2007/0166899 | A1 | 7/2007 | Yao et al. |
| 2007/0232028 | A1 | 10/2007 | Lee et al. |
| 2007/0278476 | A1 | 12/2007 | Black |
| 2008/0047604 | A1 | 2/2008 | Korevaar et al. |
| 2008/0072961 | A1 | 3/2008 | Liang et al. |
| 2008/0075954 | A1 | 3/2008 | Wardle et al. |
| 2008/0093698 | A1 | 4/2008 | Tsakalakos et al. |
| 2008/0110486 | A1 | 5/2008 | Tsakalakos et al. |
| 2008/0135089 | A1 | 6/2008 | Tsakalakos et al. |
| 2008/0149174 | A1 | 6/2008 | Chen et al. |
| 2008/0169017 | A1 | 7/2008 | Korevaar et al. |
| 2008/0315430 | A1 | 12/2008 | Weber et al. |
| 2009/0020150 | A1* | 1/2009 | Atwater ............. H01G 9/2054 136/246 |
| 2009/0020853 | A1 | 1/2009 | Kayes et al. |
| 2009/0026070 | A1 | 1/2009 | Fan et al. |
| 2009/0050204 | A1 | 2/2009 | Habib |
| 2009/0057839 | A1 | 3/2009 | Lewis et al. |
| 2009/0065048 | A1 | 3/2009 | Dasgupta et al. |
| 2009/0127540 | A1 | 5/2009 | Taylor |
| 2009/0152527 | A1 | 6/2009 | Lee et al. |
| 2009/0266411 | A1 | 10/2009 | Habib et al. |
| 2010/0028736 | A1 | 2/2010 | Unlu et al. |
| 2011/0042229 | A1 | 2/2011 | Fan |
| 2011/0192464 | A1 | 8/2011 | Urano et al. |
| 2011/0278176 | A1 | 11/2011 | He |
| 2012/0138456 | A1 | 6/2012 | Spurgeon et al. |
| 2013/0026029 | A1* | 1/2013 | Kayaert ............... C25B 1/003 204/230.8 |

FOREIGN PATENT DOCUMENTS

| | | |
|---|---|---|
| EP | 0117246 A | 7/1980 |
| JP | 11-214720 | 8/1999 |
| JP | 2005-310388 | 4/2005 |
| JP | 2005-194609 | 7/2005 |
| JP | 2011-116581 A | 6/2011 |
| KR | 10-2007-18457 | 2/2007 |
| WO | 03/005450 A2 | 1/2003 |
| WO | 2005084336 A2 | 9/2005 |
| WO | 2006/138671 A2 | 12/2006 |
| WO | 2007066087 A2 | 6/2007 |
| WO | 2008/135905 A2 | 11/2008 |
| WO | 2010/016555 A1 | 2/2010 |
| WO | 2010137014 A2 | 12/2010 |

OTHER PUBLICATIONS

Lindner, Nora, International Preliminary Report on Patentability, PCT/US2013/035026, The International Bureau of WIPO, Date of Mailing: Oct. 16, 2014.

Alexiev et al., "Minority Carrier Diffusion Lengths for High Purity Liquid Epilaxial GaAs", pp. 1-8, Nov. 1, 2004, obtained online from http://arxiv.org/ftp/cond-mat/papers/0409/0409176.pdf.

Anandan et al., "Room temperature growth of CuO nanorod arrays on copper and their application as a cathode in dye-sensitized solar cells", Materials Chemistry an Physics, vol. 93, Issue 1, Sep. 15, 2005, pp. 35-40.

Anandan et al., "Recent improvements and arising challenges in dye-sensitized solar cells", Solar Energy Materials and Solar Cells, vol. 91, Issue 9, May 23, 2007, pp. 843-846.

Basol et al., "Ultra-Thin Electrodeposited CdS/CdTe Heterojunction with 8% Efficiency", IEEE Photo. Spec. Conf., 1982, 805-808.

Basol, B., "High-efficiency electroplated heterojunction solar cell", J. Appl. Phys. 55(2), 1984, pp. 601-603.

Basol, B., "Thin Film CdTe Solar Cells—A Review", Conf. Rec. IEEE Photo. Spec. Conf., 1990, 588-594.

Bhattacharya et al., "Electrodeposition of CdTe Thin Films", 1984, 131, 2032-2041.

Bogart et al., "Diameter-Controlled Synthesis of Silicon Nanowires Using Nanoporous Alumina Membranes", Adv. Mater. 2005, 17 (1), 114-117.

Bullis, W.M., "Properties of Gold in Silicon", Solid-State Electronics, Pergamon Press, 1966, vol. 9, pp. 143-168.

Choi, Jeong Yoon, Search Report for PCT/US2008/070509, Korean Intellectual Property Office, Date of Mailing: Feb. 20, 2009.

Choi, Jeong Yoon, Written Opinion for PCT/US2008/070509, Korean Intellectual Property Office, Date of Mailing: Feb. 20, 2009.

Chu et al., "Large Area Polycrystalline Silicon Solar Cells on Unidirectionally Solidified Acid-Treated Metallurigcal Grade Silicon", Proc. IEEE Southeastcon, 1989, 1436-1441.

Davis, Jr. et al., "Impurities in Silicon Solar Cells", IEEE Transactions on Electron Devices, vol. ED-27, No. 4, Apr. 1980, 677.

de Dood, Michiel Jacob Andries, "Silicon photonic crystals and spontaneous emission", Thesis, Utrecht University, 2002.

Erts et al., "High Density Germanium Nanowire Assemblies: Contact Challenges and Electrical Characterization", J. Phys. Chem. B2006, 110, 820-826.

Fan et al., "Semiconductor Nanowires: From Self-Organization to Patterned Growth", Small 2(6), 700-717 (2006).

Fan et al., "Well-ordered ZnO nanowire arrays on GaN substrate fabricated via nanosphere lithography", Journal of Crystal Growth, 287 (2006) 34-38.

Fang et al., "Long Germanium Nanowires Prepared by Electrochemical Etching", Nano Letters, vol. 6, No. 7, pp. 1578-1580, 2006, available online Jun. 16, 2006.

Fulop et al., "High-efficiency electrodeposited cadmium telluride solar cells", Appl. Phys. Lett., 1982, 40, 327-328.

Gibbons et al., "A 14% efficient nonaqueous semiconductor/liquid junction solar cell", Appl. Phys. Lett., 1984, 45, 1095-1097.

Givargizov, "Growth of Whiskers from the Vapor Phase", Highly Anisotropic Crystals, D. Reidel, Dordrecht, Holland, 1987, p. 169.

Goodey et al., "Silicon Nanowire Array Photoelectrochemical Cells", J. Am. Chem. Soc., 2007, 129 (41), 12344-12345.

Gowrishankar et al., "Fabrication of densely packed, well-ordered, high-aspect-ratio silicon nanopillars over large areas using block copolymer lithography", Thin Solid Films, 2006, 513, 289-294.

Gronet et al., "n-Type silicon photoelectrochemistry in methanol: Design of a 10.1% efficient semiconductor/liquid junction solar cell", Proc. Natl. Acad. Sci. USA, vol. 80, pp. 1152-1156, Feb. 1983.

Gstrein et al., "Effects of Interfacial Energetics on the Effective Surface Recombination Velocity of Si/Liquid contacts", J. Phys. Chem., B2002, 106, 2950-2961.

(56) References Cited

OTHER PUBLICATIONS

Gu et al., "Quantitative Measurement of the Electron and Hole Mobility-Lifetime Products in Semiconductor Nanowires", Nano Letters, 2006, vol. 6, No. 5, 948-952.
Guo, L. Jay, "Nanoimprint Lithography: Methods and Material Requirements", Advanced Materials, 19, 495-513, 2007.
Haick et al., "Electrical Characteristics and Chemical Stability of Non-Oxidized, Methyl-Terminated Silicon Nanowires", J. Am. Chem. Soc., 2006, 128, 8990-8991.
Harris et al., "Semiconductors for Photoelectrolysis", Ann Rev. Mater. Sci., 1978, 8:99-134.
Haxel et al., "Rare Earth Elements—Critical Resources for High Technology", U.S. Geological Survey Fact Sheet, 087-02, 2002, p. 3.
Hochbaum et al., "Controlled Growth of Si Nanowire Arrays for Device Integration", Nano Letters, 2005, vol. 5, No. 3, 457-460.
Hopkins et al., "Impurity Effects in Silicon for High Efficiency Solar Cells", Journal of Crystal Growth 75 (1986) 67-79.
Huang et al., "Fabrication of Silicon Nanowire Arrays with Controlled Diameter, Length, and Density", Advanced Materials, 19, 744-748 (2007).
Huynh et al., "Hybrid Nanorod-Polymer Solar Cells", Science, 295, 2425 (2002).
Ismail et al., "Hydrogen Gas Production for Electronic-Grade Polycrystalline Silicon Growth", IEEE ICSE, 2002, 53-56.
Jacoboni et al., "A Review of Some Charge Transport Properties of Silicon", Solid State Electronics, 1977, vol. 20, 77-89I.
Jenny et al., "Semiconducting Cadmium Telluride", Physical Review, vol. 96, No. 5, Dec. 1, 1954, 1190-1191.
Jung et al., "Aligned Carbon Nanotube-Polymer Hybrid Architectures for Diverse Flexible Electronic Applications", Nano Letters, 2006, vol. 6, No. 3, pp. 413-418.
Kang et al., "Hybrid solar cells with vertically aligned CdTe nanorods and a conjugated polymer", Applied Physics Letters, 86, Issue 11, 113101-1-113101-3 (2005).
Kang et al., "Well-aligned CdS nanorod/conjugated polymer solar cells", Solar Energy Materials and Solar Cells, vol. 90, Issue 2, Jan. 23, 2006, pp. 166-174.
Kawano et al., "Fabrication and properties of ultrasmall Si wire arrays with circuits by vapor-liquid-solid growth", Sensors and Actuators, A 97-98 (2002) 709-715.
Kayes et al., "Comparison of the device physics principles of planar and radial p-n. junction nanorod solar cells", Journal of Applied Physics, 2005, 97:114302.1-114302.11.
Kayes et al., "Radial PN Junction Nanorod Solar Cells: Device Physics Principles and Routes to Fabrication in Silicon", IEEE PVSC, 2005, pp. 55-58.
Kayes et al., "Synthesis and Characterization of Silicon Nanorod Arrays for Solar Cell Applications", IEEE WCPEC, 2006, 1, 221-224.
Kayes et al., "Growth of vertically aligned Si wire arrays over large areas (>1cm2) with Au and Cu Catalysts", Supplementary Material, App. Phys. Letter, 91, 103110 (2007).
Kelzenberg et al., "Photovoltaic Measurements in Single-Nanowire Silicon Solar Cells", Nano Letters, 2008, vol. 8, No. 2, pp. 710-714.
Kim et al., "Photovoltaic Properties of Nano-particulate and Nanorod Array ZnO Electrodes for Dye-Sensitized Solar Cell," Bull. Korean Chem. Soc., vol. 27, No. 2, 295-298, Feb. 2006.
Kim et al., "Stretchable and Foldable Silicon Integrated Circuits", Science, 2008, 320, 507-511.
Kim, Do Weon, International Search Report and Written Opinion, PCT/US2013/021339, Korean Intellectual Property Office, Date of Mailing: Apr. 29, 2013.
Klein et al., "Electrochemcial Fabrications of Cadmium Chalcogenide Microdiode Arrays", Chem. Mater., 1993, 5, 902-904.
Kressin et al., "Synthesis of Stoichiometric Cadmium Selenide Films via Sequential Monolayer Electrodeposition", Chem. Mater., 1991, 3, 1015-1020.
Lauhon et al., "Epitaxial core-shell and core-multishell nanowire heterostructures", Nature, vol. 420, Nov. 7, 2002, pp. 57-61.
Law et al., "Semiconductor Nanowires and Nanotubes", Annu. Rev. Mater. Res., 2004, 34:83-122.
Law et al., "Nanowire dye-sensitized solar cells", Nat. Mater., 2005, 4, 455-459.
Lee et al., "Solvent Compatibility of Poly(dimethylsiloxane)-Based Microfluidic Devices", Anal. Chem., 2003, 75, 6544-6554.
Lee, Dong Wook, International Search Report and Written Opinion, PCT/US2013/051413, Korean Intellectual Property Office, Oct. 24, 2013.
Lepiller et al., "New Facets of CdTe Electrodeposition in Acidic Solutions with Higher Tellurium Concentrations", Journal of the Electrochemical Society, 151 (5) C348-C357, 2004.
Lin et al., Efficient photoinduced charge transfer in TiO2 nanorod/conjugated polymer hybrid materials, Nanotechnology, 17 (2006), 5781-5785.
Lombardi et al., "Synthesis of High Density, Size-Controlled Si Nanowire Arrays via Porous Anodic Alamina Mask", Chem. Mater., 2006, 18, 988-991.
Lopatiuk-Tripak, "Studies of minority carrier transport in ZnO", Superlattices and Microstructures, vol. 42, Issues 1-6, Jul.-Dec. 2007, pp. 201-205, Available online May 25, 2007.
Maiolo et al., "High Aspect Ratio Silicon Wire Array Photoelectrochemical Cells", J. Am. Chem. Soc., 129, 2007, 12346-12347.
Miaiolo et al., "Macroporous Silicon as a Model for Silicon Wire Array Solar Cells", J. Phys. Chem. C 2008, 112, 6194-6201.
Martensson et al., "Fabrication of individually seeded nanowire arrays by vapour-liquid-solid growth", Nanotechnology, 14 (2003) 1255-1258.
McCandless et al., "Cadmium Telluride Solar Cells", In Handbook of Photovoltaic Science and Engineering, 2003, pp. 617-657.
McDonald et al., "Poly(dimethylsiloxane) as a Material for Fabricating Microfluidic Devices", Acc. Chem. Res., 2002, 35 (7), 491-499.
Meissner et al., "Light-Induced Generation of Hydrogen at CdS-Monograin Membranes", Chemical Physics Letters, vol. 96, No. 1, Mar. 25, 1983, pp. 34-37.
Mohan et al., "Controlled growth of highly uniform, axial/radial direction-defined, individually addressable InP nanowire arrays", Nanotechnology 16 (2005) 2903-2907.
Morales et al., "A Laser Ablation Method for the Synthesis of Crystalline Semiconductor Nanowires", Science, 79, 208-211 (1998).
Morin et al., "Biomimetic Assembly of Zinc Oxide Nanorods onto Flexible Polymers", J. Am. Chem. Soc., 2007, 129 (45), 13776-13777.
Nakamura, Yukari, International Preliminary Report on Patentability and Written Opinion, PCT/US2013/051413, The International Bureau of WIPO, Date of Mailing: Jan. 29, 2015.
Nickitas-Etienne, Athina, International Preliminary Report on Patentability, PCT/US2013/021339, The International Bureau of WIPO, Date of Mailing: Jul. 24, 2014.
Park, Jae Hun, Search Report for PCT/US2008/070495, Korean Intellectual Property Office, Date of Mailing: Feb. 20, 2009.
Park, Jae Hun, Written Opinion for PCT/US2008/070495, Korean Intellectual Property Office, Date of Mailing: Feb. 20, 2009.
Park, Jae Hun, Search Report for PCT/US2008/070523, Korean Intellectual Property Office, Date of Mailing: Feb. 20, 2009.
Park, Jae Hun, Written Opinion for PCT/US2008/070523, Korean Intellectual Property Office, Date of Mailing: Feb. 20, 2009.
Park, Jae Hun, Search Report for PCT/US2008/070518, Korean Intellectual Property Office, Date of Mailing: Feb. 20, 2009.
Park, Jae Hun, Written Opinion for PCT/US2008/070518, Korean Intellectual Property Office, Date of Mailing: Feb. 20, 2009.
Paulson et al., "Spectroscopic ellipsometry investigation of optical and interface properties of CdTe films deposited on metal foils", Solar Energy Materials & Solar Cells, 82 (2004) 279-90.
Peng et al., "Fabrication of Large-Area Silicon Nanowire p-n. Junction Diode Arrays", Adv. Mater., 2004, 16 (1), 73-76.
Peng et al., "Aligned Single-Crystalline Si Nanowire Arrays for Photovoltaic Applications", Small, 2005, 1, 1062-1067.

(56) References Cited

OTHER PUBLICATIONS

Pushparaj et al., "Flexible energy storage devices based on nanocomposite paper", PNAS, Aug. 21, 2007, vol. 104, No. 34, pp. 13574-13577.

Raravikar et al., "Embedded Carbon-Nanotube-Stiffened Polymer Surfaces", Small, 1 (3), 317 (2005).

Rosenbluth et al., "630-mV open circuit voltage, 12% efficient n-Si liquid junction", Appl. Phys. Lett., 1985, 45, 423-425.

Rosenbluth et al., "Kinetic Studies of Carrier Transport and Recombination at the n-Silicon/Methanol Interface", Journal of the American Chemical Society, vol. 108, No. 16, Aug. 6, 1986, pp. 4689-4695.

Rosenbluth et al., "'Ideal' Behavior of the Open Circuit Voltage of Semiconductor/Liquid Junctions", 1989, 93, 3735-3740.

Routkevitch et al., "Electrochemical Fabrication of CdS Nanowire Arrays in Porous Anodic Aluminum Oxide Templates", J. Phys. Chem. 1996, 100, 14037-14047.

Routkevitch et al., "Nonlithographic nano-wire arrays: fabrication, physics, and device applications", IEEE Transactions on Electron Devices, vol. 43, Issue 10, Oct. 1996, pp. 1646-1658.

Sansom et al., "Controlled partial embedding of carbon nanotubes within flexible transparent layers", Nanotechnology, 19, 035302 (2008).

Sayad et al., "Determination of diffusion length in photovoltaic crystalline silicon by modelisation of light beam induced aurrent", Superlattices and Microstructures, vol. 45, Issues 4-5, Apr.-May 2009, pp. 393-401.

Schmidt et al., "Diameter-Dependent Growth Direction of Epitaxial Silicon Nanowires", Nano Letters, 2005, vol. 5, No. 5, 931-935.

Shchetinin et al., "Photoconverters Based on Silicon-Crystal Whiskers", Translated from Izmerital'naya Teknika, No. 1, pp. 35-36, 1978.

Shimizu et al., "Synthesis of Vertical High-Density Epitaxial Si(100) Nanowire Arrays on a Si(100) Substrate Using an Anodic Aluminum Oxide Template", Advanced Materials, 19, 917-920 (2007).

Struthers, J.D., "Solubility and Difusivity of Gold, Iron, and Copper in Silicon", J. Appl. Phys, 27, 1956, p. 1560.

Sunden et al., "Microwave assisted patterning of vertically aligned carbon nanotubes onto polymer substrates", J. Vac. Sci. Technol. B 24(40 Jul./Aug. 2006, pp. 1947-1950.

Sze, M., "Physics of Semiconductor Devices", 2nd Edition, Wiley, New York, 1981, p. 21.

Thai, Luan C., Non-Final Office Action, U.S. Appl. No. 12/176,100, USPTO, Jan. 6, 2010.

Touskova et al., "Preparation and characterization of CdS/CdTe film solar cells", Thin Solid Films, vol. 293, Issues 1-2, Jan. 30, 1997, pp. 272-276.

Tsakalakos et al., "Silicon nanowire solar cells", Applied Physics Letters, 91, 2007, 233117-1-33117-3.

Tsakalakos et al., "Strong broadband optical absorption in silicon nanowire films", J. of Nanophotonics, 2007, 1 , 313552-1-013552-10.

Wagner et al., "Vapor-Liquid-Solid Mechanism of Single Crystal Growth", Applied Physics Letters, Mar. 1, 1964, vol. 4, No. 5, pp. 89-90.

Wagner et al., "The Vapor-Liquid-Solid Mechanism of Crystal Growth and Its Application to Silicon", Trans. Metal. Soc. AIME, 1965, 233 (6), 1053-1064.

Wang et al., "Titania-nanotube-array-based photovoltaic cells", Applied Physics Letters, 89, 023508, (3 pages), published online Jul. 12, 2006.

Westwater et al., "Control of the Size and Position of Silicon Nanowires Grown via the Vapor-Liquid-Solid Technique", Jpn. J. Appl. Phys., vol. 36 (1997) pp. 6204-6209.

Westwater et al., "Si Nanowires Grown via the Vapour-Liquid Solid Reaction", Phys. Stat. Sol., vol. 165, Issue, 37, pp. 37-42 (1998).

Woodruff et al., "Vertically Oriented Germanium Nanowires Grown from Gold Colloids on Silicon Substrates and Subsequent Gold Removal", Nano Letters, 2007, vol. 7, No. 6, 1637-1642.

Wu et al., "A Study on Deep Etching of Silicon Using Ethylene-Diamine-Pyrocatechol-Water", Sensors and Actuators, (1986) 333-343.

Wu et al., "Semiconductor nanowire array: potential substrates for photocatalysis and photovoltaics", Topics in Catal., 2002, 19 (2), 197-202.

Xia et al., "One-Dimensional Nanostructures: Synthesis, Characterization, and Applications", Adv. Mater., 2003, 15(5), 353-389.

Yang et al., "Experimental Observation of an Extremely Dark Material by a Low-Density Nanotube Array", Nano Letters, 2008, vol. 8, No. 2, 446-451.

Yao et al., "Si nanowires synthesized with Cu catalyst", Materials Letters, 61 (2007), pp. 177-181.

Yoon et al., "Minority carrier lifetime and radiation damage coefficients of germanium—Conference Record of the Thirty-first IEEE", Photovoltaic Specialists Conference, Jan. 3-7, 2005, pp. 842-845.

Yu et al., "Silicon Nanowires: Preparation, Device Fabrication, and Transport Properties", J. Phys. Chem. B 2000, 104, 11864-11870.

Yu et al., "Large-area blown bubble films of aligned nanowires and carbon nanotubes", Nat. Nanotechnol., 2007, 2 (6) 372-377.

Zach et al., "Synthesis of Molybdenum Nanowires with Millimeter-Scale Lengths Using Electrochemical Step Edge Decoration", Chem. Mater. 2002, 14, 3206-3216.

* cited by examiner

SOLAR FUELS GENERATOR

CROSS REFERENCE TO RELATED APPLICATIONS

This Application claims the benefit of U.S. Provisional Patent Application Ser. No. 61/619,316, filed on Apr. 2, 2012, and incorporated herein in its entirety.

STATEMENT REGARDING FEDERALLY SPONSORED RESEARCH

This invention was made with government support under DE-SC000493/T-105066 awarded by the Department of Energy. The government has certain rights in the invention.

FIELD OF THE INVENTION

The invention relates to solar generators, and more particularly, to solar fuels generators.

BACKGROUND

Solar cells are used to generate electrical energy from sunlight. While these cells can generate electricity from sunlight, they do not efficiently store the generated energy. As a result, the energy must be used immediately or stored in devices such as batteries. Storing large amounts of energy in batteries is impractical and expensive. An alternative to storing solar energy in a device is to convert the solar energy into a fuel that can be used at a later time. A solar fuels generator is a device that converts the energy from the sun and water into a fuel such as hydrogen fuel. As a result, there is a need for a practical solar fuels generator.

SUMMARY

The solar fuels generator includes an ionically conductive separator between a first phase and a second phase. The generator also includes an photoanode that uses incident light and one or more components of the first phase to generate cations during operation of the solar fuels generator. The generator also includes a cation conduit that provides a pathway along which the cations travel from the photoanode to the separator.

Another version of the solar fuels generator includes an ionically conductive separator between a first phase and a second phase. The generator also includes a photocathode that uses cations generated from the first phase to generate the solar fuel in the second phase. The generator also includes a cation conduit that provides a pathway along which cations generated at the photoanode can travel from the separator to the photocathode.

A method of generating solar fuels includes generating a cation at a photoanode located in a gaseous first phase. The method also includes conducting the generated cation through a cation conduit to a separator that is located between the first phase and a second phase.

Another method of generating solar fuels includes using cations to generate the solar fuel a photocathode in a gaseous second phase. A separator being between the first phase and the second phase. The method also including conducting the cations through a cation conduit from the separator to a portion of the photocathode that is spaced apart from the separator.

DESCRIPTION

Prior solar fuels generators use liquid water as the feedstock. One of the difficulties associated with these systems is the generation of gas bubbles such as hydrogen bubbles and oxygen bubbles. The bubbles reduce the contact area between the water and catalysts used by these systems. Further, these bubbles can refract and/or scatter incoming illumination away from the photoelectrodes used in these systems. As a result, the bubbles can reduce the efficiency of the solar fuels generator. This issue can be resolved by switching from a liquid feedstock to a gaseous feedstock. For instance, the feedstock can be a carrier gas that includes water vapor. The water vapor can serve as a reactant in the generation of the solar fuel.

The use of water vapor as a reactant in a solar fuels generator is challenging because of the mass transport issues such as whether enough water can be transported to the electrodes in order to effectively produce a solar fuel. However, the inventors found that with humidified Ar(g) at 20° C. as a feedstock to an electrolyzer, an electrolysis current density of 10 mA cm$^{-2}$ was sustained at an applied voltage of 1.6 V and a current density of 20 mA cm$^{-2}$ was observed at an applied voltage of ~1.7 V. Additionally, the inventors surprisingly found that lower voltages were required to support a particular level of current density when using water vapor in the feedstock than were required liquid water was used as the feedstock. Since the voltage that can be achieved by a solar fuels generator that uses light absorption as the voltage source is around 1.5-2 V, these results indicate that that the solar fuels generator can convert water vapor to a solar fuel using terrestrial solar illumination as the energy source. More particularly, these results show that a solar fuels generator can convert water vapor to a hydrogen gas fuel without using an external power source other than unconcentrated light from the sun.

The solar fuels generator includes a separator bewteen a first phase and a second phase. The solar fuels generator also includes one or more photoanodes exposed to the first phase and one or more photocathodes exposed to the second phase. During operation of the solar fuels generator, protons are generated at the photoanodes and then travel through the separator. When the feedstock is a liquid, these protons easily travel from the photoanodes to the separator through the liquid. However, the protons do not readily travel through a gaseous feedstock. As a result, the solar fuels generator employs cation conduits that conduct cations from the photoanodes to the separator. As a result, these cation conduits increase the efficiency of a solar fuels generator using a carrier gas that includes water vapor as the feedstock.

Figure 1:
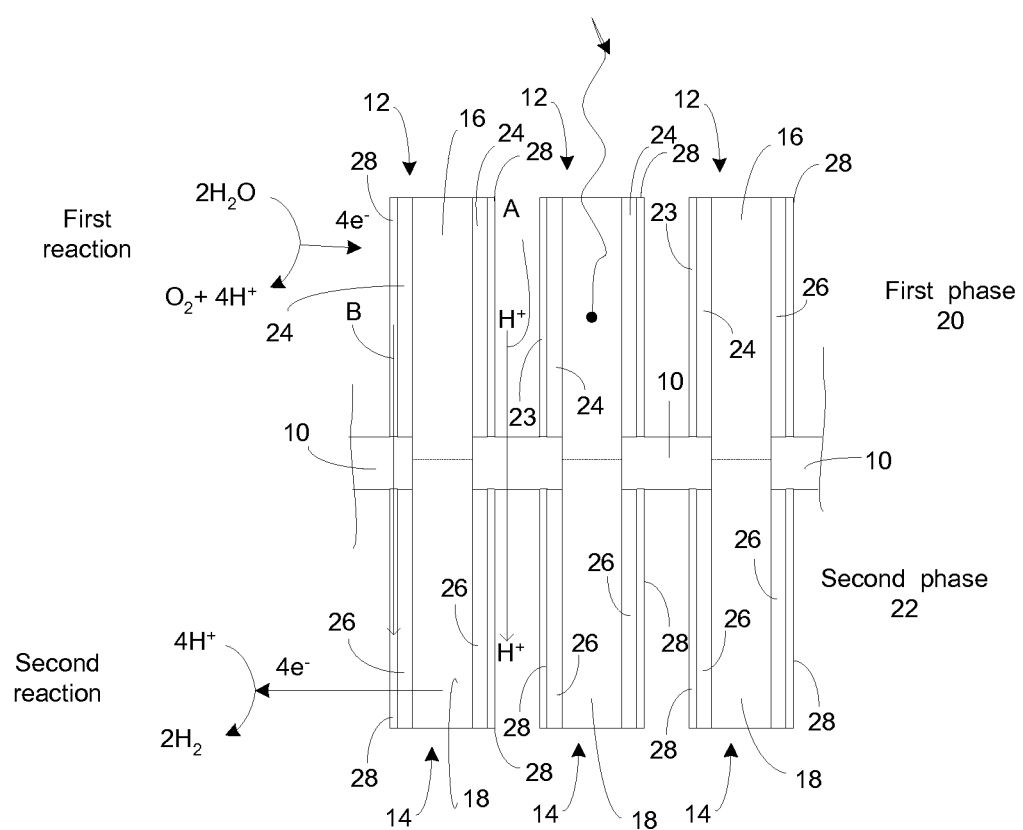
FIG. 1 is a cross section of a solar fuels generator.

FIG. 1 is a cross section of a solar fuels generator. The solar fuels generator includes a separator that separates a first phase 20 from a second phase 22. Electrodes are positioned in the separator. For instance, photoanodes 12 and photocathodes 14 extend from opposing sides of the separator. Although not shown in FIG. 1, the separator can surround each of the photoanodes 12 and photocathodes 14. The photoanodes and photocathodes convert incident light into excited electron-hole pairs that then drive a chemical reaction The photoanodes 12 include an photoanode light absorber 16 selected to absorb light at a wavelength to which the photoanodes will be exposed during operation of the solar fuels generator. Additionally, the photocathodes include a photocathode light absorber 18 selected to absorb light at a wavelength to which the photocathodes 14 will be exposed during operation of the solar fuels generator.

Suitable materials for the photoanode light absorbers 16 and the photocathode light absorbers 18 include, but are not limited to, semiconductors. In some instances, the photoanode light absorbers 16 include or consist of a semiconductor and/or the photocathode light absorbers 18 include or consist of a semiconductor. The bandgap of the semiconductors included in the photoanode light absorbers 16 can be larger than the bandgap of the semiconductors included in the photocathode light absorbers 18. Suitable semiconductors for the photoanode light absorbers 16 include, but are not limited to, metal oxides, oxynitrides, sulfides, and phosphides that are stable in an oxidizing environment such as $WO_3$, $TiO_2$, and TaON. Suitable semiconductors for the photocathode light absorbers 18 include, but are not limited to, p-type silicon, InP, $Cu_2O$, GaP, and $WSe_2$.

In some instances, the photoanode light absorbers 16 and/or the photocathode light absorbers 18 are doped. The doping can be done to form one or more pn junctions within the photoanode light absorbers 16 and the photocathode light absorbers 18. For instance, the photoanode light absorber 16 can be an n-type semiconductor while the photocathode light absorber 18 can be a p-type semiconductor. A p-n junction can also be present within either the photocathode light absorbers 18 or the photoanode light absorber 16 or both, and is arranged so that electrons flow from cathode to a reduction catalyst (discussed below) and holes flow from the anode to an oxidation catalyst (discussed below).

The dashed lines at the interface of the photoanode light absorber 16 and the photocathode light absorber 18 illustrate an interface between the materials of the photoanode light absorber 16 and the photocathode light absorber 18. However, the photoanode light absorber 16 and the photocathode light absorber 18 can be the same material and/or include the same dopant. As a result, a photoanode light absorber 16 and the interfaced photocathode light absorber 18 can be a continuous block of material. In these instances, the dashed lines shown in FIG. 1 may represent a feature that is not discernable in the solar fuels generator. One example of a material that can serve as both the photoanode light absorber 16 and the photocathode light absorber 18 is p-type silicon, which can function as the absorber on both the photoanode and photocathode sides of the separator. In particular type silicon is a candidate for the photocathode material because it is cathodically stable under illumination in acidic aqueous media and in conjunction with various metal catalysts can evolve $H_2(g)$ from $H_2O$.

Other possible choices for the light absorber include semiconductors having wider bandgaps than silicon that are stable in the water vapor medium. Oxide semiconductors are believed to be a possible choice. Some of the light absorbers that can be used as a light absorber include, but are not limited to: tandem structure photoanodes, including tungsten oxide ($WO_3$), bismuth vanadium oxide ($BiVO_4$), tantalumoxynitride (TaON), and titanium oxide ($TiO_2$); tandem structure photocathodes, including silicon (Si), cuprous oxide ($Cu_2O$), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$); multijunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the photocathode light absorber and the photoanode light absorber generates the photovoltage that drive the electrolysis. When semiconductors are used for the photocathode light absorber and the photoanode light absorber, the achievable voltage depends on the choice of semiconductor materials, the associated bandgaps, and doping arrangements as is known in the solar cell arts. Accordingly, the material selections and arrangements can be selected to provide the desired voltage levels. For instance, the tandem and multijunction structures discussed above in which two or more semiconductors in series add their voltages together can be used in order to achieve elevated voltages.

In some instances, the photocathode light absorber 18 and the photoanode light absorber 16 are high aspect ratio structures such as cylinders, wires, or similar shapes with square, rectangular, oval, or irregular cross sections. The aspect ratio is the ratio of the length of the semiconductor: width or diameter of the semiconductor. Narrowing the width of the semiconductors reduces the distance that minority carriers must diffuse radially in order to reach the surface of the semiconductor. Accordingly, a suitable average width for the photocathode light absorbers 18 and/or the photoanode light absorbers 16 can be about the minority-carrier diffusion length of the material. In some instances, the average width for the photocathode light absorbers 18 and/or the photoanode light absorbers 16 is in a range of 100 nm-10 µm.

High aspect ratio structures reduce the charge-carrier flux to the surface of the semiconductor. This reduced flux can reduce the turnover frequency required of any catalysts and can permit the use of more abundant and less active catalysts. Suitable average aspect ratios for the photocathode light absorbers 18 include, but are not limited to, ratios greater than 2:1, or 5:1, and/or less than 50:1, 100:1, or 200:1. Additionally or alternately, suitable average aspect ratios for the photoanode light absorbers 16 include, but are not limited to, ratios greater than 2:1, or 5:1, and/or less than 50:1, 100:1, or 200:1. In one example, the average aspect ratio for the photocathode light absorbers 18 and/or the photoanode light absorbers 16 is in a range of 44:1-70:1. The photoanode light absorbers 16 can have the same average dimensions as the photocathode light absorbers 18 or different average dimensions from the photoanode light absorbers 16. Wire or cylinder shaped photoanode light absorbers 16 and/or the photocathode light absorbers 18 can support the above aspect ratios. The use of high aspect ratio structures is optional.

The separator 10 separates a first phase 20 from a second phase 22. For instance, although not shown, the perimeter of the separator 10 can be clamped between flanges that extend from the side of an enclosure into the interior of the enclosure cell. When the perimeter of the separator 10 is clamped in the flanges, the separator 10 spans the interior of the cell. The first phase 20 can be located in the cell on one side of the separator 10 with the photoanodes 12 in the first phase 20 and the second phase 22 can be located in the cell on the opposing side of the separator 10 with the photocathodes 14 in the second phase 22. The first phase is generally different from the second phase. In some instances, the first phase 20 is a liquid that includes water. In some instances, the first phase 20 is a gas that includes water vapor. The second phase can be a gas or a liquid. In some instances, the first phase 20 is a gas that includes water vapor and the second phase is a gas.

When the first phase is a gas that includes water vapor, a suitable relative humidity for the gas includes relative humidities above 40%, 60% or 70%. Additionally or alternately, when the first phase is a gas that includes water vapor, suitable gas flow rates to each of the photoanodes includes flowrates greater than 0.02 L min$^{-1}$, or 0.05 L min$^{-1}$, or 0.2 L min$^{-1}$. Suitable gasses for use in the first phase include, but are not limited to, Ar, nitrogen, helium, and air. When the second phase is a gas that includes water vapor, in some instances, the second gas has a relative humidity above 40%, 60% or 70%.

The separator 10 is ionically conductive. In some instances, the separator 10 is cationically conductive while concurrently being sufficiently nonconductive to the other components of the first phase and the second phase that the first phase and the second phase remain separated from one another. For instance, in some instances, the separator 10 is cationically conductive and non-conductive or substantially non-conductive to nonionic atoms and/or compounds. In some instances, the separator 10 is cationically conductive while being non-conductive or substantially non-conductive to nonionic atoms and/or nonionic compounds and also to anions. Accordingly, the separator 10 can provide a pathway along which cations can travel from the first phase to the second phase without providing a pathway or a substantial pathway from the first phase to the second phase to one, two, or three entities selected from a group consisting of anions, nonionic atoms or nonionic compounds. In some instances, it may be desirable for the separator 10 to conduct both anions and cations. For instance, when the first phase and/or the second phase has elevated pH levels a separator 10 that conducts both anions and cations may be used. As a result, in some instances, the separator 10 conducts cations and anions but not nonionic atoms or nonionic compounds.

Additionally, the separator should be able to incorporate and support the photoanode light absorbers and the photocathode light absorbers, exchange ions sufficiently to prevent the buildup of a pH gradient, separate the gaseous reaction products sufficiently to prevent them from re-combining, and be sufficiently transparent to the incoming light that the light can be absorbed by both the photoanode light absorbers 16 and the photocathode light absorbers 18; and provide enough structural support to the photoanode light absorbers 16 and the photocathode light absorbers 18 that these structures are sufficiently vertical to provide pathways for the protons to travel to and/or from the separator 10. A suitable separator can be a single layer or material or multiple layers of material. Suitable materials for the separator 10 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. An example is represented by the following Formula I:

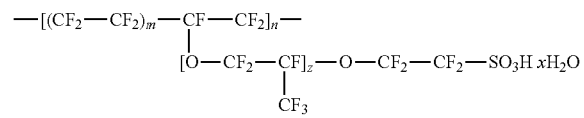

wherein m, n, and z are each greater than 0, or each greater than 1. A suitable material having a structure according to Formula I is sold under the trademark NAFION®. NAFION® is an example of a material that is cationically conductive of cations but is not conductive of anions or nonionic atoms or nonionic compounds. Another suitable separator includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

The photoanodes 12 include one or more photoanode catalysts 24. The photoanode catalyst can be an oxidation catalyst. When the feedstock includes water vapor, a suitable oxidation catalyst catalyzes water oxidation. The one or more photoanode catalysts 24 can be positioned on the photoanode light absorber 16. In some instances, the one or more catalysts directly contact the photoanode light absorber 16. Additionally or alternately, instances, the one or more photoanode catalysts 24 coat the photoanode light absorber 16 or are positioned in islands on the photoanode light absorber 16. Suitable anode catalysts 24 include, but are not limited to, $IrO_2$, $RuO_2$, $Co_3O_4$, $MnO_2$, $NiFeO_x$ where x is greater than 1 and/or less than 4, $IrRuO_y$ where y is greater than 1 and/or less than 4, $NiLaO_z$ where z is greater than 1 and/or less than 4, $BaSrCoFeO_z$, where z is greater than 1 and/or less than 4, platinum (Pt), and mixtures thereof. One example of a suitable anode catalyst is a 1:1 $IrO_2$:$RuO_2$.

The photocathodes 14 include one or more photocathode catalysts 26. For instance, the photocathode catalyst 26 can be a reduction catalyst that catalyzes the second reaction. For instance, the photocathode catalyst can catalyze proton reduction. The one or more photocathode catalysts 26 can be positioned on the photocathode light absorber 18. In some instances, the one or more catalysts directly contact the photocathode light absorber 18. Additionally or alternately, the one or more photocathode catalysts 26 coat the photocathode light absorber 18 or are positioned in islands on the photocathode light absorber 18 as shown in FIG. 1B. Suitable photocathode catalysts 26 include, but are not limited to, Pt, NiMo, and NiCo.

During operation, the solar fuels generator can be exposed to light such as sunlight, terrestrial solar illumination, AM1 solar radiation, or similar illumination having approximately 1 kilowatt per square meter of incident energy or less. These light sources can be unconcentrated. In some instances, the solar fuels generator is oriented such that the light travels through the photoanodes 12 before reaching the photocathodes 14. Since the photoanode light absorber 16 has a larger bandgap than the photocathode light absorber 18, the photoanodes 12 absorb higher energy (shorter wavelength) light and allow lower energy (longer wavelength) light to pass through the separator 10 to the photocathodes 14. The photocathodes 14 can then absorb the longer wavelengths. Alternately, the light can be incident on both the photoanodes and the photocathodes.

The absorption of light by a photoanode light absorber 16 generates hole-electron pairs within the photoanode light absorber 16. The position of an n-type photoanode light absorber 16 in the first phase 20 produces an electrical field that causes the holes to move to the surface of the photoanode light absorber 16 and then the surface of the photoanode catalyst 24 where the oxidation of the water in the first phase 20 is catalyzed. The oxidation of water is labeled reaction 1 in FIG. 1A. The electrons move from the photoanode light absorber 16 move toward the photocathode light absorber 18 as a result of the electrical field.

The oxidation of the water generates gaseous oxygen and hydrogen cations ($H^+$, called protons below). As noted above, the separator 10 is cationically conductive. As a result, the protons can travel through the separator 10 and enter the second phase 22 in response to the pH gradient resulting from the generation of protons in the first phase 20. The movement of the protons from the first phase 20 into the second phase 22 is shown by the arrow labeled A in FIG. 1A.

The absorption of light by the photocathode light absorber 18 generates hole-electron pairs within the photocathode light absorber 18. The presence of a p-type photocathode light absorber 18 in the second phase 22 produces an electrical field that causes the electrons within the photocathode light absorber 18 to move to the surface of the photocathode light absorber 18 and then the surface of the photocathode catalyst 26 where they react with the protons to form hydrogen gas. The reduction of the protons is labeled reaction 2 in FIG. 1. The resulting hydrogen gas can be stored for use as hydrogen fuel. The holes generated in the photocathode light absorber 18 by the absorption of light move from the photocathode light absorber 18 toward the photoanode light absorber 16 as a result of the electrical field and can recombine with the electrons from the photoanode light absorber 16.

Cation conduits 28 are located on the photoanode light absorbers 16 and/or the photocathode light absorbers 18. For instance, the cation conduits 28 are positioned such that a line perpendicular to lateral surfaces of the photoanode light absorbers 16 and/or the photocathode light absorber 18 passes through the cation conduits. In some instances, the cation conduits 28 are located such that the photoanode catalyst 24 is located between the cation conduit 28 and the photoanode light absorber 16 as shown in FIG. 1 and such that a line perpendicular to lateral surfaces of the photoanode light absorbers 16 passes through the photoanode catalyst 24 and also at least one cation conduit 28. When the photoanode catalyst 24 is located between the cation conduit 28 and the photoanode light absorber 16, the cation conduit 28 can be in direct physical contact with the photoanode catalyst 24 or other materials can be located between the cation conduit 28 and the photoanode catalyst 24. Additionally or alternately, the cation conduits 28 can be located such that the photocathode catalyst 26 is located between the cation conduit 28 and the photocathode light absorber 16 and such that a line perpendicular to lateral surfaces of the photocathode light absorbers 18 passes through the photocathode catalyst 26 and also at least one cation conduit 28. When the photocathode catalyst 26 is located between the cation conduit 28 and the photocathode light absorber 18, the cation conduit 28 can be in direct physical contact with the photocathode catalyst 26 or other materials can be located between the cation conduit 28 and the photocathode catalyst 26.

The cation conduits 28 are ionically conductive. In some instances, the cation conduits 28 are cationically conductive while being non-conductive or substantially non-conductive to one, two, or three entities selected from a group consisting of anions, nonionic atoms or nonionic compounds.

The cation conduits 28 can be in direct physical contact with the separator 10. Since the separator 10 and the cation conduits 28 are both cationically conductive, the contact between the cation conduits 28 and the separator 10 provides a pathway that cations can travel from the photoanode 12 side of the separator 10 to the photocathode 14 side of the separator 10. For instance, the arrow labeled B in FIG. 1 shows the movement of the protons from the photoanode 12 side of the separator 10 to the photocathode 14 side of the separator 10. When the first phase is a gas phase, the protons resulting from the first reaction do not readily travel through the first phase to the separator. More particulary, the protons do not readily travel from the photoanode catalyst to the separator through the first pahse. The cation conduits 28 make up for this deficiency by providing an efficient pathway from photoanodes to the separator and then into the second phase. More particulary, when the cation conduits contact the photoanode catalyst and the separator, the cation conduits provide an pathway that the protons can travel from the photoanode catalyst to the separator. As a result, when the first phase is a gas, the dominant pathway that the protons travel from the from the photoanode 12 side of the separator 10 to the photocathode 14 side of the separator 10 may be the pathway indicated by the arrow labeled B rather than the arrow labeled A.

When the second phase is a gas phase, the protons resulting from the first reaction do not readily travel from the separator to the photocathodes through the second phase. More particulary, the protons do not readily travel from the separator to the photocathode catalyst through the second phase. The cation conduits 28 make up for this deficiency by providing an efficient pathway from separator to the photocathodes. More particulary, when the cation conduits contact the photocathode catalyst and the separator, the cation conduits provide a pathway that the protons can travel from separator to the photocathode catalyst.

The cation conduits 28 can include one or more layers or material. The material for the cation conduits 28 on the photoanode side of the separator and the material for the cation conduits 28 on the photocathode side of the separator can be the same or different. In some instances, material for the cation conduits 28 on the photoanode side of the separator and the material for the cation conduits 28 on the photocathode side of the separator are the same material as the separator 10. Further, the cation conduits 28 can be continuous with the separator 10 in that there is not an interface between the cation conduits 28 and the separator 10.

The cation conduits 28 can be a solid or can be included in a layer that is a solid. A suitable material for the cation conduits 28 includes, but is not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. An example is represented by the following Formula I:

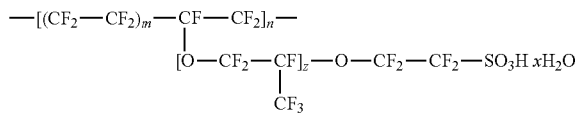

wherein m, n, and z are each greater than 0, or each greater than 1. A suitable material having a structure according to Formula I is sold under the trademark NAFION®.

As noted above, the cation conduits 28 and the separator 10 can be constructed of the same material and can optionally be continuous with the separator 10. However, even when cation conduits 28 and the separator are constructed of the same material, the cation conduits 28 and the separator 10 can have a different thickness. In some instances, all or a portion of the cation conduits 28 are thin enough that a reactant can diffuse through the cation conduit 28 to the underlying catalyst. For instance, the cation conduits 28 on the photoanode side of the separator can be thin enough to permit the water from water vapor or liquid water to diffuse through the cation conduit 28 to the underlying catalyst. This diffusion of water through the cation conduit 28 allows the first reaction shown in FIG. 1 to occur at a surface of the photoanode catalyst 24. In contrast, the separator 10 can be thick enough to support the photoanode light absorbers and/or the photocathode light absorbers such that the far end of each light absorber is held above the separator 10. Increasing the portion of the light absorber embedded in the separator 10 can increase the support of the light absorber. However, it is possible that increasing the portion of the semiconductor in the separator 10 can increase the portion of light that is absorbed by the separator 10 rather than by the light absorbers. A suitable average percentage of the photoanode light absorber length and/or photocathode light absorber length that is inside of the separator 10 includes percentages greater than 5%, or 20% and/or less than 80%, or 100%. As a result, the separator may be thicker than the cation conduits 28. For instance, a ratio for a thickness of the separator to a thickness of one or more of the cation conduits can be greater than 5:1, 50:1, or 100:1.

Although FIG. 1 illustrates the cation conduits 28 extending from the separator and then up the entire length of the photoanode light absorbers 16 and the photocathode light absorbers 18, the cation conduits 28 can extend only part way up the length of the photoanode light absorbers 16 and/or the photocathode light absorbers 18. For instance, the cation conduits 28 can extend more than 10%, 30% or 50% and/or less 70% or 90% up the length of the photoanode light absorbers 16 and/or the photocathode light absorbers 18.

Although the solar fuels generators of FIG. 1 illustrate the cation conduits 28 as a layer of material over a layer of the photoanode catalyst 24 or the photocathode catalyst 26, the layer represented by the photoanode catalyst 24 or the combination of layers represented by the photoanode catalyst 24 and the touching cation conduit 28 can be a layer where the photoanode catalyst 24 is dispersed through the cation conduit 28. As an example, the layer represented by the photoanode catalyst 24 can be a layer where the photoanode catalyst or particles of the photoanode catalyst are coated with the cation conduit 28. Additionally or alternately, the layer represented by the photocathode catalyst 26 or the combination of layers represented by the photocathode catalyst 26 and touching conduit 28 can be a layer where the photocathode catalyst 26 is dispersed through the cation conduit 28. As an example, the layer represented by the photocathode catalyst 26 can be a layer where the photocathode catalyst 26 or particles of the photocathode catalyst 26 are coated with the cation conduit 28. In these arrangements, the cation conduit 28 provides a pathway along which the cations can travel through the photocathode catalyst 26 and also through the photoanode catalyst. For instance, the line labeled B can illustrate the path of the protons from the first phase to the second phase. As a result, these embodiments of the solar fuels generator can operate as disclosed in the context of FIG. 1.

Figure 2:
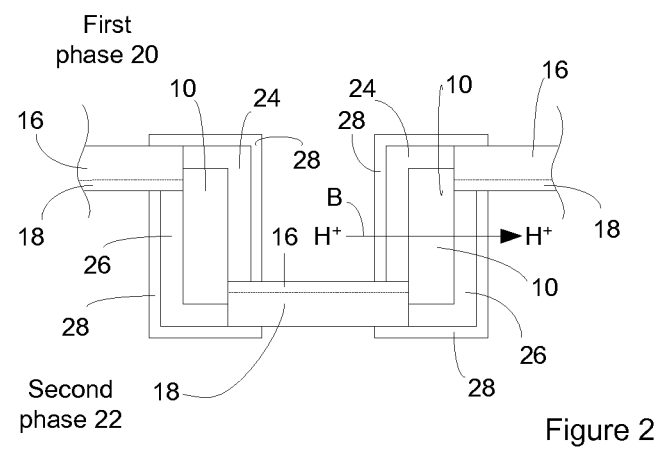
FIG. 2 is a cross section of another embodiment of a solar fuels generator.
Figure 3:
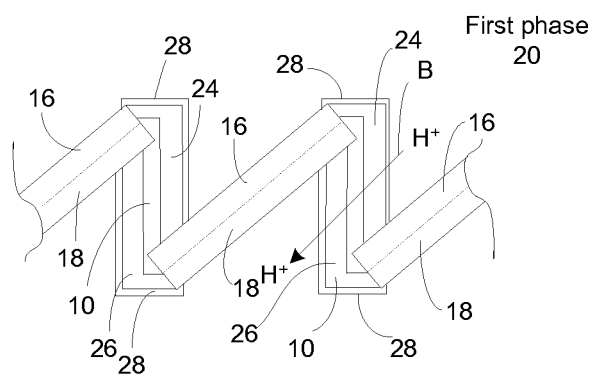
FIG. 3 is a cross section of another embodiment of a solar fuels generator.

The components of FIG. 1 can be re-arranged to achieve other solar fuels generators as shown in FIG. 2 and FIG. 3. The solar fuels generators of FIG. 1 through and FIG. 3 illustrate the cation conduits 28 as a layer of material over a layer of the photoanode catalyst 24 or the photocathode catalyst 26. However, the layer represented by the photoanode catalyst 24 or the combination of layers represented by the photoanode catalyst 24 and the touching cation conduit 28 can be a single layer where the photoanode catalyst 24 is dispersed through the cation conduit 28. As an example, the layer represented by the photoanode catalyst 24 or the layers represented by the photoanode catalyst 24 and the touching cation conduit 28 can be a single layer where the photoanode catalyst or particles of the photoanode catalyst are coated with the cation conduit 28. Further, the layer represented by the photocathode catalyst 26 or the combination of layers represented by the photocathode catalyst 26 and touching conduit 28 can be combined into a single layer where the photocathode catalyst 26 is dispersed through the cation conduit 28. As an example, the layer represented by the photocathode catalyst 26 or the layers represented by the photocathode catalyst 26 and the touching cation conduit 28 can be a single layer where the photocathode catalyst 26 or particles of the photocathode catalyst 26 are coated with the cation conduit 28. In the solar fuels generators of FIG. 2 and FIG. 3, when these material arrangements are used, the presence of cation conduit 28 in the layer of photoanode catalyst and/or in the layer of photoanode catalyst provides a pathway along which the cations can travel through the photocathode catalyst 26 and also through the photoanode catalyst 24. For instance, the line labeled B in FIG. 2 and FIG. 3 can illustrate the path of the protons from the first phase to the second phase. As a result, these embodiments of the solar fuels generator can operate as disclosed in the context of FIG. 1. A suitable method for coating a catalyst with a cation conductor includes, but is not limited to, casting the catalyst in a liquid solution containing the ionomer and later processing that ionomer to an active membrane form.

The photoanode catalyst 24 and/or photocathode catalyst 26 can include materials in addition to the catalyst. For instance, the above layers that includes photoanode catalyst 24, layers that include photoanode catalyst 24 and cation conduit 28, layers that includes a photocathode catalyst 26, and layers that include photocathode catalyst 26 and cation conduit 28 can include one or more components selected from a group consisting of electrically conductive fillers, electrically conductive materials, diluents, and/or binders. For instance, a layer can include a metal mesh or metal substrate that provides support to the catalyst and/or cation conduit and/or enhances the electrical conductivity of the catalyst and/or cation conduit. In some instances, the metal mesh or substrate acts as a current collector. A suitable method for forming a layer that includes an electrically conducting mesh or substrate, a catalyst and optionally a cation conduit includes hot pressing a mesh to a membrane and casting catalyst particles on the metal mesh from a solution of the membrane ionomer material.

The above illustrations show that the light absorbers in direct contact with the catalysts in order to provide electrical communication between the light absorbers and catalysts. However, this electrical communication can be achieved through other mechanisms. For instance, a metal mesh or metal substrate in a catalyst layer can be connected directly to the appropriate light absorber or an electrical conductor such as a metal trace or wire can be used to connect the metal mesh or substrate in a catalyst layer to the appropriate light absorber.

Figure 4:
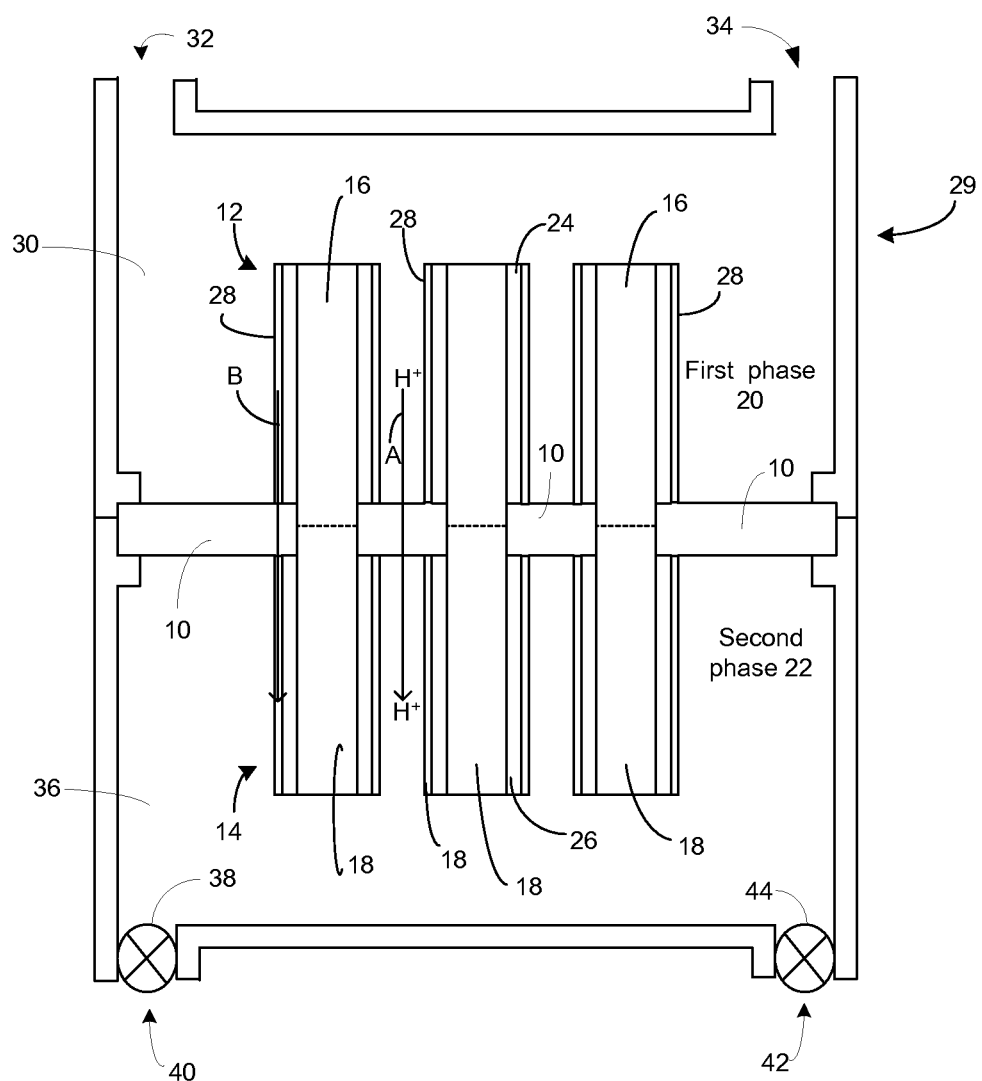
FIG. 4 illustrates the solar fuels generator of FIG. 1 included in a system that permits control of delivery of feedstocks to solar fuels generator and removal of the resulting fuel from the solar fuels generator.

FIG. 4 illustrates the solar fuels generator of FIG. 1 included in a system that permits control of delivery of feedstocks to the photoanodes and removal of the fuel from the photocathodes. Although the system of FIG. 4 includes the solar fuels generator of FIG. 1, the illustrated system can be used in conjunction with the other solar fuels generators disclosed above.

The solar fuels generator is positioned in an enclosure 29 such that the solar fuels generator separates the first phase and the second phase. All or a portion of the enclosure 29 can be fully or partially transparent to the light that is to be incident on the electrodes. The enclosure 29 defines a first chamber 30 having an inlet port 32 and an outlet port 34. The feedstock can enter the first chamber 30 through the inlet port 32 and the resulting contents of the first chamber 30 can exit the first chamber 30 through the outlet port 34. In the case where the feedstock is a gas that includes water vapor, the gas can enter the first chamber 30 through the inlet port 32 and exit the chamber through the outlet port 34. As a result, the inlet port 32 and the outlet port 34 can be used to control the content and characteristics of the first phase.

The enclosure 29 can also define a second chamber 36 having an inlet port 38 that optionally includes an inlet valve 40 and an outlet port 42 that optionally includes an outlet valve 44. A gaseous or liquid supply stream can enter the second chamber 36 through inlet port 38 and the resulting second phase can exit the second chamber 36 through the outlet port 42. As a result, the inlet port 38 and the outlet port 34 can be used to control the content and characteristics of the second phase. For instance, the second chamber 36 can be filled and maintained in a close state by closing the two valves on the second inlet port 38 and the second outlet port 42 so that a reaction can be run in a batch mode. Alternatively, the valves can be maintained in an open condition or removed from the system so that a reaction can be run in a continuous mode.

The reaction that takes place on the photocathode side of the separator can be supported entirely by the flux of protons ($H^+$) that flow across the separator, and no net provision of protons on the photocathode side from another source is needed but can optionally be provided. While no source of hydrogen needs to be provided, it may be advantageous to have a source of water or water vapor on the photocathode side of the separator. For instance, the supply stream and second phase can include water or water vapor. The presence of water or water vapor in the supply stream can help to hydrate the separator. Separators such as NAFION® should be hydrated in order to maintain high ionic conductivity because water preferentially fills hydrophilic, negatively charged channels enable the selective transfer of protons across the separator. Without sufficient water present, the channels constrict and the separator conductivity is significantly reduced. In addition or as an alternative to including water or water vapor in the supply stream, hydration of the separator may be possible by periodically or continually sprinkling or misting the separator with water. Alternatively, a NAFION® separator could be fabricated with a web of hydroponic polymer integrated into the separator that would wick water from a reservoir located in the system. In some instances, separator materials that are less sensitive to water content are used.

In addition or as an alternative to water and/or water vapor. The supply stream and second phase can include a carrier gas. The carrier can be selected to carry away the generated fuel to a collection location. Additionally or alternately, the carrier gas can be used to maintain a target pressure within the second chamber 36. In some instances, a suitable pressure is in the approximate range of 1 atmosphere or ambient pressure. A suitable carrier gas for inclusion in the second phase includes, but is not limited to, Ar, Ntirogen and $CO_2$.

The supply stream and/or the second phase can also include or consist of a reactant. Although the above discussion discloses using the solar fuels generator to generate hydrogen gas for use as a fuel, the solar fuels generator can be employed to generate other fuels that include hydrocarbons such as methane. Hydrocarbon fuels include or consists of carbon and hydrogen and may include or consist of carbon, hydrogen, and oxygen. These fuels can be generated by delivering an additional reactant to the photocathodes. For instance, the supply stream and/or second phase can include one or more additional reactants. The following generalized reaction can represent the overall reaction used by the solar fuels generator in the generation of these fuels:

$$M\ CO_2 + N\ H_2O \rightarrow C_M H_2 NO_{(2M+N-2P)} + P\ O_2 \quad \text{(Equation 1)}$$

where M, N, and P are non-negative numbers and, in some instances, are integers. $C_M H_2 NO_{(2M+N-2P)}$ represents the fuel produced in this reaction and $CO_2$ serves as the reactant that is delivered to the photocathodes. Examples of the fuels that can be produced using this reaction in combination with the disclosed solar fuels generator include carbon monoxide, methanol, methane, ethanol, and formic acid. The following table 1 presents values for M, N and P that can be used to generate a particular fuel.

TABLE 1

| M | N | P | Fuel | Chemical Name |
|---|---|---|------|---------------|
| 1 | 2 | 2 | $CH_4$ | Methane |
| 2 | 4 | 3 | 2 molecules of $CH_3OH$ produced | Methanol |
| 2 | 2 | 1 | 2 molecules of HCOOH produced | Formic acid |
| 2 | 2 | 2 | $CH_3COOH$ | Acetic Acid |
| 2 | 3 | 3 | $C_2H_6O$ | Ethanol |
| 3 | 3 | 4 | $CH_3CH_2COH$ | Propanol |
| 3 | 4 | 4 | $HOCH_2CH_2CH_2OH$ | 1,3-Propanediol |
| 4 | 3 | 4 | $CH_3CH_2COCOOH$ | 2-Oxybutyric acid |
| 4 | 5 | 6 | $CH_3CH_2CH_2COH$ | Butanol |
| 6 | 6 | 6 | $C_6H_{12}O_6$ | Glucose |

The half reactions for each of the above fuels illustrate how the solar fuels cell generates a particular one of the hydrocarbon fuels in the above Table 1. For instance, when using the solar fuels cell to generate methanol, the half reaction at the photoanode, the half reaction at the photocathode and the overall reaction are as follows:

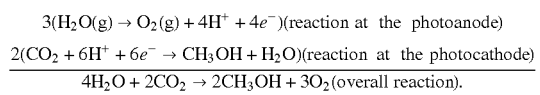

$$3(H_2O(g) \rightarrow O_2(g) + 4H^+ + 4e^-)\text{(reaction at the photoanode)}$$
$$\underline{2(CO_2 + 6H^+ + 6e^- \rightarrow CH_3OH + H_2O)\text{(reaction at the photocathode)}}$$
$$4H_2O + 2CO_2 \rightarrow 2CH_3OH + 3O_2 \text{(overall reaction).}$$

Since the overall reaction is Equation 1 with M=N=P=6, these half reactions show the relationship between the overall reaction and the half reactions at the photoanodes and the photocathodes. Additionally, the reaction at the photoanode is the same as the first reaction disclosed in FIG. 1. The protons and electrons are provided to the photocathode as a result of the reaction at the photoanode followed by flow of the protons and electrons across the separator. As a result, the primary chemical change needed to generate methanol instead of hydrogen is the delivery of the $CO_2$ to the photocathode as a reactant.

As is evident from Equation 1, each of the hydrocarbon fuels generated through the use of Equation 1 is generated by delivering $CO_2$ to the photocathodes as a reactant. It is believed that a particular one of the hydrocarbon fuels can be generated by controlling variables such as the proportions (or partial pressures) of the reactant, the temperature of the reaction, the voltages applied to the catalysts, and the chemical composition of the catalysts. The Equation 1 reaction that produces glucose represents photosynthesis. Photosynthesis occurs at ambient temperatures in the vicinity of room temperature (e.g., in the range of 10 to 40° C., and possibly in the range of 0 to 100° C.). As a result, it is believed that operating the solar fuels generator at temperatures in these ranges can generate glucose.

When the second phase includes a reactant, the photocathode catalyst can be altered to catalyze the reaction at the photocathode. For instance, when the second phase includes $CO_2$ as a reactant, a suitable photocathode catalyst 26 can include one or more components selected from the group consisting of copper (Cu), zinc (Zn), tin (Sn), nickel (Ni), platinum (Pt), palladium (Pd), rhodium (Rh), iridium (Ir), metal porphyrins and phthalocyanines. Other metals can also serve as a photocathode catalyst 26 when the second phase includes $CO_2$ as a reactant.

Although the enclosure 29 is disclosed as defining two chambers, a suitable enclosure 29 may be configured to define a single chamber in which the photoanodes are positioned or in which the photocathodes are positioned. In some instances, the enclosure 29 includes heating elements in order to permit the solar fuels generator to operate at higher temperatures. The heating elements can be active heating elements that require an external energy source such as resistive heaters, heated fluid heaters, or combustion based heaters. Additionally or alternately, the heating elements can be passive heating elements where an external energy source is not required. For instance, the heating elements can be a black body layer that produces heat by collecting light not absorbed by the photoanode light absorbers or the photocathode light absorbers. Additionally or alternately, elevated temperatures may be achieved by heating the supply stream and/or the feedstock. Elevated temperatures may be able to provide higher current densities. Further, higher temperature gasses can have a greater water content that can further increase the current density. Additionally, the use of elevated temperatures may aid in generating particular hydrocarbons. Since the following experimental results establish that hydrolization of water can be achieved using only solar illumination at atmospheric conditions as the only energy source for the solar fuels generator, in some instances, the system excludes active heating elements and/or passive heating elements.

A suitable method of forming the separator on the anode light absorbers and the cathode light absorbers includes, but is not limited to, solution casting an ionomer material onto the semiconductor. A suitable method for applying an anode catalyst to the anode light absorbers includes, but is not limited to, electrodeposition, sputtering, electroless deposition, spray pyrolysis, atomic layer deposition, etc. A suitable method for applying a cathode catalyst to the anode light absorbers includes, but is not limited to, electrodeposition, sputtering, electroless deposition, spray pyrolysis, atomic layer deposition, etc. A suitable method for forming the cation conduit on the cathode catalyst and/or the anode catalyst includes, but is not limited to, solution casting the ionomer material onto the semiconductor and/or catalyst.

EXAMPLES

Example 1

An electrolyzer was used to explore the performance of the solar fuels generator with water vapor as the feedstock. The electrolyzer components were obtained from Clean Fuel Cell Energy, LLC, 3350 Ulmerton Road, Suite 23, Clearwater, Fla. 33762). In contrast to the solar fuels generators disclosed above, the electrolyzer used an external power source to generate the electrolysis voltage. The electrolyzer included two graphite end plates (one for the photoanode and one for the photocathode) that had serpentine gas flow channels (1.8 mm wide, 2.0 mm deep, spaced 1.0 mm apart) grooved into the side of the plate that faced the separator. The channels represented ~80% of the active area of the separator that was directly exposed to the input gas flow. In other embodiments, a serpentine pattern having narrower channels and closer spacing may be advantageous to better match the electrical characteristics of the catalysts (such as charge carrier diffusion lengths) and the mechanical spacing of the graphite contacts to the catalysts. The separator was NAFION® (available from Lynntech Inc., 2501 Earl Rudder Freeway South, Suite 100, College Station, Tex. 77845, NAFION® 115, 127 μm thick) that had a photoanode catalyst loading of 3.0 mg cm$^{-2}$ of IrRuO$_x$ (1:1IrO2:RuO2) and a photocathode catalyst loading of 3.0 mg cm$^{-2}$ of Pt black. The projected active area of the separator was 5 cm$^2$. Gas diffusion layers were not used, due to the instability under electrolysis conditions of the carbon-based material in a typical gas diffusion layer.

Ultra-high purity Argon gas (UHP Ar(g)) (>99.99%) was used as the carrier gas in all experiments, except for those specifically identified experiments in which the carrier gas was either $N_2(g)$ (>99.99%) or house air (1.10±0.15 ppth of water vapor). The carrier gas was saturated with water vapor by passing the gas at a flow rate of 0.04-0.5 L min-1 (controlled by flowmeters from Chemglass) through a bubbler that had been filled with 18 MΩ-cm resistivity deionized $H_2O$, obtained from a Barnstead Nanopure system. The humidified gas stream was mixed with a dry gas stream, both at controlled flow rates, to create a gas flow of the desired relative humidity (RH). The system produced precise (±2% RH) and reproducible humidity values in the gas flow stream, as monitored by a relative humidity probe (Omega, RH-USB sensor). A water-saturated carrier gas stream to which dry gas had not been added had a RH of ~95%. To minimize the back diffusion of ambient oxygen into the electrolysis unit, the output stream from the electrolyzer was bubbled through an oil bath. For the electrolysis of liquid water, the electrolyzer cell was immersed in 18 MΩ-cm resistivity $H_2O$ (l) that had been deoxygenated by bubbling with Ar(g) for >1 h. All experiments were conducted at an ambient temperature of 20° C.

The electrolyzer was allowed to equilibrate at open circuit for more than 2 h before measurements of the current density-voltage (J-V) behavior under each set of experimental conditions (flow rate, RH, etc.) were performed. An SI model 1286 Schlumberger Potentiostat was used to apply a DC bias to the electrolyzer cell, and to measure the current through the cell, through current collector pins in contact with each of the graphite end plates of the electrolysis unit. The current reached an approximate steady state value after more than 300 s at each applied bias. The J-V behavior was also measured by sweeping the voltage, at a scan rate of 1 mV s$^{-1}$, from open circuit to 2.6 V. The current values measured at a given potential in the scan were in close agreement with the current that was measured at that same potential after 300 s under potentiostatic conditions. The current density was determined using the projected area of the active part of the separator electrode assembly without correcting for the estimated area in direct contact with the graphite end plates of the electrolyzer. In an electrolyzer for use in a system having no electrical connection to an external power source, a photoabsorber such as a photovoltaic cell or photovoltaic array can be used to provide the potential between the photocathode and the photoanode, to provide the needed charge carriers.

Figure 5:
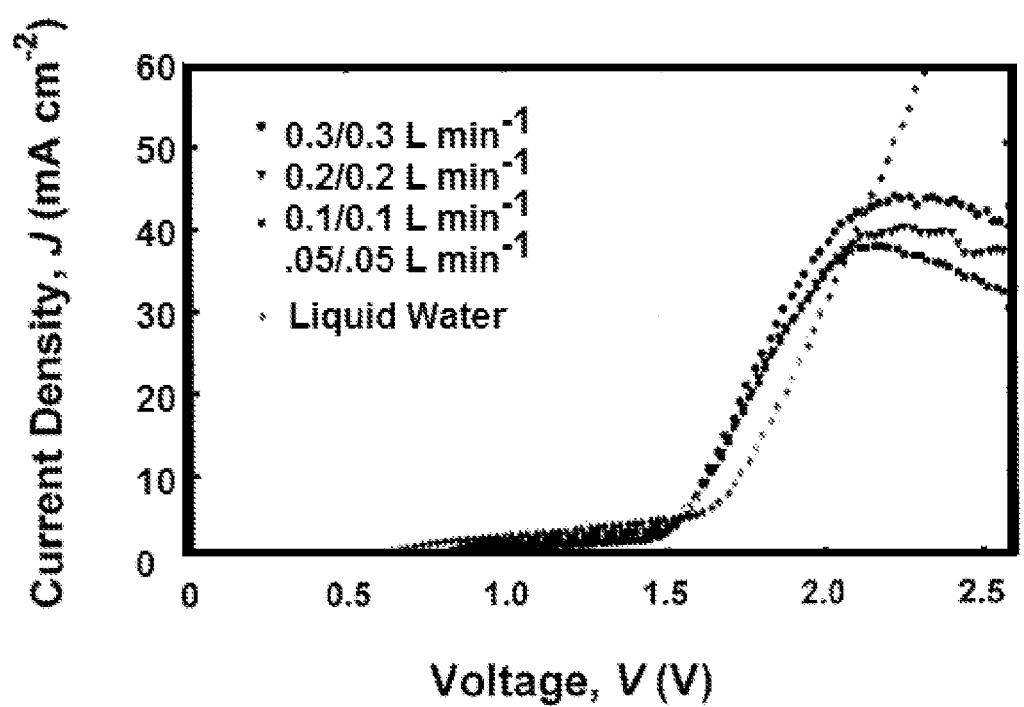
FIG. 5 comparers the current density versus applied voltage results for an electrolyzer with liquid water as a feedstock and for a gas with water vapor as the feedstock.

The current density versus applied voltage (J-V) results are presented in FIG. 5 for the electrolyzer with liquid water as a feedstock and for the Ar(g) saturated with water vapor as the feedstock. The information provided in the legend specifies the gas flow rate to the photoanode/photocathode. The carrier gas was UHP Ar(g) with a RH of 95% in each case, and the operating temperature was 20° C. The data represented by diamonds is the J-V behavior of the electrolyzer immersed in liquid water at 20° C. For J<30 mA cm$^{-2}$, the J-V results were very similar for both the liquid feedstock and the water vapor feedstock. At a given voltage, more current was observed with water vapor as the feedstock than with liquid water as the feedstock. The limiting electrolysis current density increased with increasing Ar(g)/$H_2O$(g) flow rate, from a value of ~25 mA cm$^{-2}$ at 0.05 L min$^{-1}$ to ~40 mA cm$^{-2}$ at a flow rate of 0.3 L min$^{-1}$ to each electrode. In contrast, when immersed in liquid water, the electrolyzer did not reach a limiting current density within the experimentally measured voltage range.

Since a solar fuels generator constructed as disclosed above can provide a voltage of around 1.5-2.0 V depending on the structure and materials used in the photoanode light absorber and the photocathode light absorber, the results show that electrolysis in a solar illuminated solar fuels generator can sustained electrolysis at a current density of J=10-20 mA cm$^{-2}$ with water vapor as the feedstock. Further, the flux of water molecules to the separator limited the current density at higher current densities. However, higher flow rates of humidified gas to the electrolyzer can provide an increased mass flux of water to the separator surface, reducing the effect of mass transport limitations. For instance, increasing the flow rate of humidified Ar(g) to each electrode, from 0.05 L min$^{-1}$ to 0.3 L min$^{-1}$, increased the limiting electrolysis current density by 60% (from 25 mA cm$^{-2}$ to 40 mA cm$^{-2}$). These results are lower bounds on the attainable current density in such a system because no gas diffusion layer was used and the graphite end plates were directly attached to the catalyst layer, so only the portion (~80%) of the catalyst that was directly exposed to the gases, and then only the fraction that was within useful electrical contact laterally to the electrodes, was electrochemically active as configured in this test system.

Example 2

Figure 6:
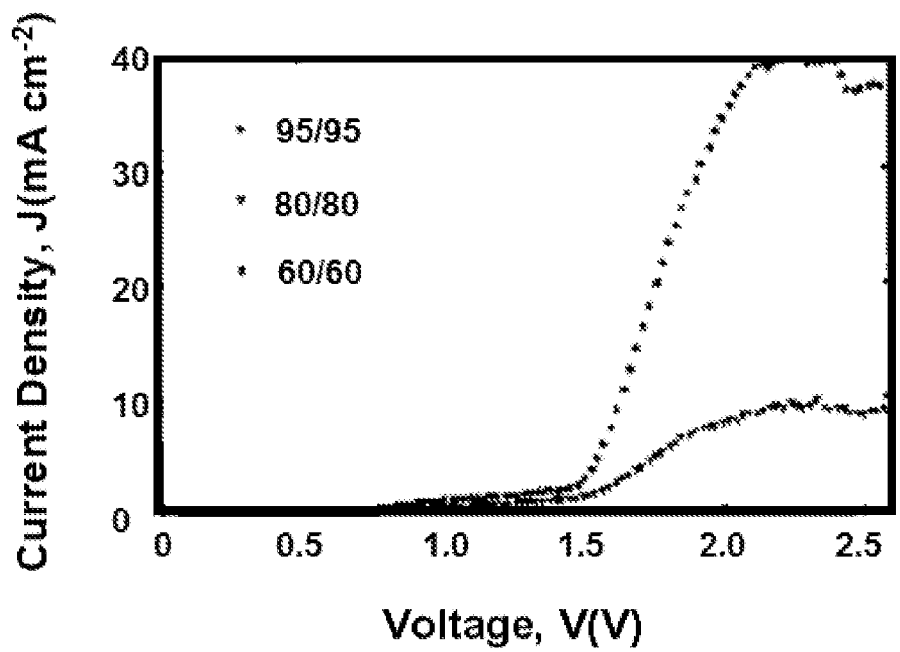
FIG. 6 compares the current density versus applied voltage results for an electrolyzer operating on gas feedstocks with different relative humidity values.

Current density versus applied voltage (J-V) results are presented in FIG. 6 for the electrolyzer using Ar(g) carrier gas with water vapor as the feedstock. The relative humidity of the input carrier gas was varied. The information provided in the legend specifies the relative humidity of the gas stream to the photoanode/photocathode. As is evident from the legend, this data was generated for equal levels of relative humidity on both sides of the separator. In each case, the carrier gas was UHP Ar(g) at a flow rate of 0.2 L min$^{-1}$ in each case, and the operating temperature was 20° C.

These results show that decreases in relative humidity can reduce electrolysis performance. The data also shows that very low levels of electrolysis current sustained at a relative humidity of ≤60%. Without being bound to theory, it is believed that the drop in the electrolysis performance may be due to drying of the separator.

Example 3

Figure 7:
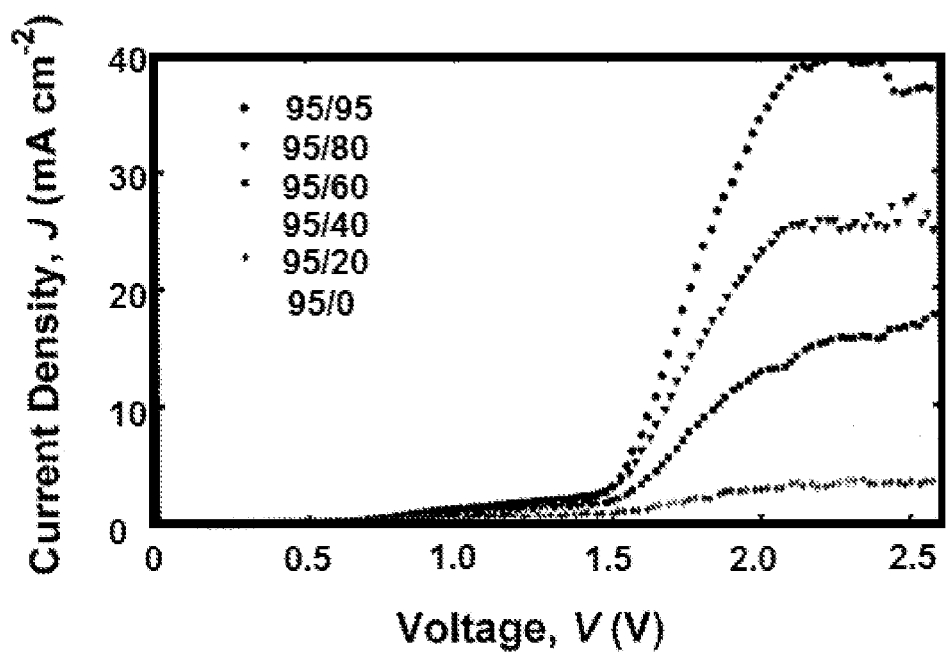
FIG. 7 compares the current density versus applied voltage results for an electrolyzer operating on gas feedstocks with different relative humidity values.

Current density versus applied voltage (J-V) results are presented in FIG. 7 for the electrolyzer using Ar(g) carrier gas with water vapor as the feedstock. The relative humidity of the input carrier gas was varied in the second phase but not in the first phase. The information provided in the legend of FIG. 7 specifies the relative humidity of the gas stream to the photoanode/photocathode.

Figure 8:
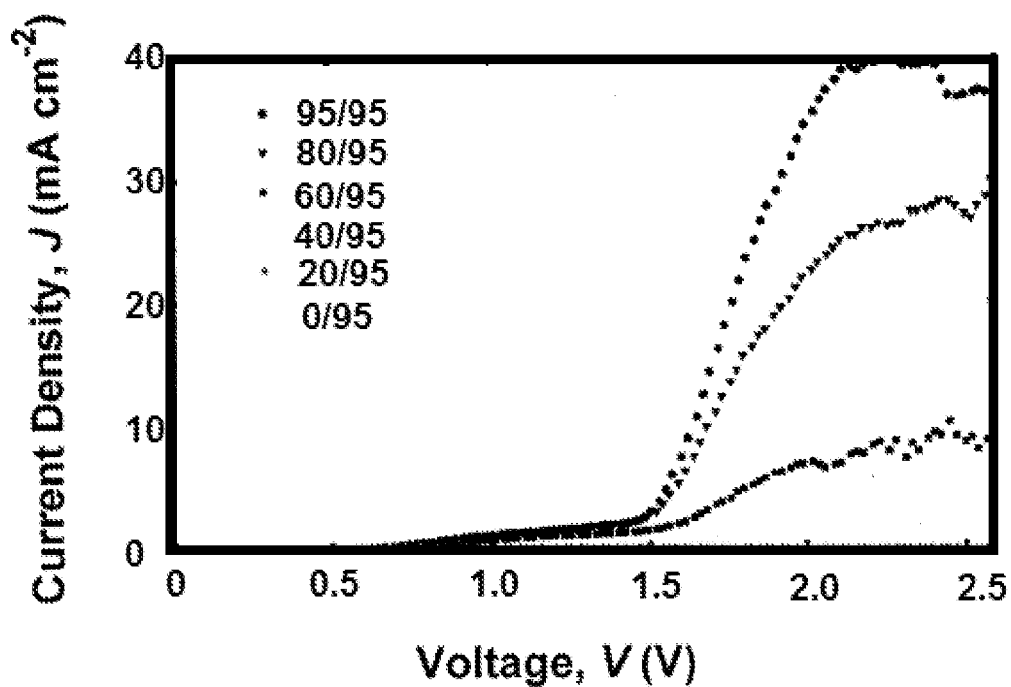
FIG. 8 compares the current density versus applied voltage results for an electrolyzer operating on gas feedstocks with different relative humidity values.

Current density versus applied voltage (J-V) results are presented in FIG. 8 for the electrolyzer using Ar(g) carrier gas with water vapor as the feedstock. The relative humidity of the input carrier gas was varied in the first phase but not in the second phase. The information provided in the legend of FIG. 8 specifies the relative humidity of the gas stream to the photoanode/photocathode.

The difference between the J-V behavior when reducing humidity at the photocathode (FIG. 7) and reducing humidity at the photoanode (FIG. 8) was fairly minor, the electrolyzer performed somewhat better when the relative humidity was reduced at the photocathode. This result may occur because water is decomposed at the photoanode and accordingly lowers the water content at the photoanode as compared to the photocathode.

Example 4

Figure 9:
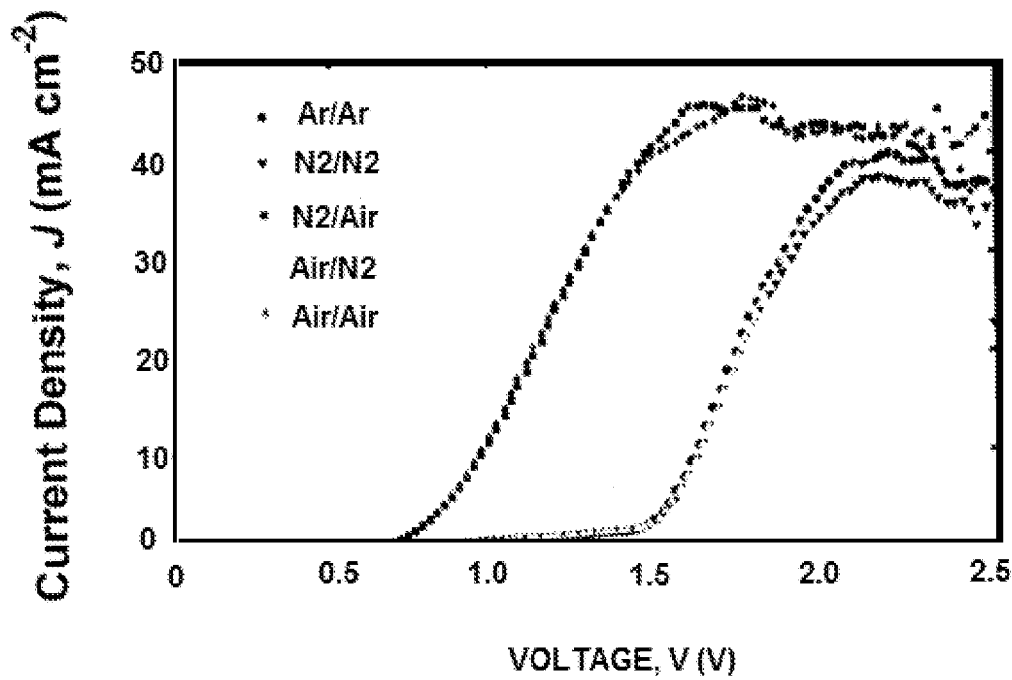
FIG. 9 compares the current density versus applied voltage results for an electrolyzer operating on different carrier gasses.

Current density versus applied voltage (J-V) results are presented in FIG. 9 for the electrolyzer when varying different carrier gasses in the first phase and the second phase. For instance, the carrier gas was varied between Argon gas (UHP Ar(g)) (>99.99%), $N_2$(g) (>99.99%) or house air (1.10±0.15 ppth of water vapor). The legend specifies the carrier gas delivered to the photoanode/photocathode. The addition of $O_2$(g) in air to the carrier gas feed to the photoanode appears to have little effect on the behavior of the electrolyzer. However, the presence of $O_2$(g) in air at the photocathode had a strong effect on the J-V behavior of the electrolyzer.

These results indicate that when $O_2$(g) in air is delivered to the photocathode, the photocathode is essentially performing the opposite reaction to the photoanode, reducing $O_2$(g) back into water by combining $O_2$(g) with protons coming from the separator. The onset of current occurred for V greater than 500 mV, rather than at 0 V, due to the catalytic overpotential. Because the reduction of $O_2(g)$ is thermodynamically favored relative to $H_2(g)$ evolution, the steady-state flux of $O_2(g)$ to the catalyst sites at the photocathode impairing overall cell efficiency. The results also indicate that above 1.5 V, $H_2(g)$ evolution occurs at the photocathode and competes kinetically with $O_2(g)$ reduction in consuming protons. If $H_2(g)$ is produced rapidly enough relative to the input air flow rate, the $H_2(g)$ could purge the $O_2(g)$ from the catalyst surface, ensuring maximum $H_2(g)$ production. The $H_2(g)$ will need to be separated from any $O_2(g)$ in the photocathode effluent downstream before the gases recombine to form water. If no $O_2(g)$ is input to the photocathode, the photocathode should self-purge and become depleted of $O_2(g)$, except for the steady-state $O_2(g)$ crossover from the photoanode. Therefore, while it is possible to expose the photoanode of a water vapor photoelectrolysis system to the atmosphere during operation in the field, the introduction of air to the photocathode is desirable under conditions for which the reduction of $O_2(g)$ is not replacing the evolution of $H_2(g)$.

Although the solar fuels generator is disclosed as being used in combination with a gaseous first phase and a gaseous second phase, the first phase and/or the second phase can be a fluid, liquid, or solid.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A solar fuels generator, comprising:
an ionically conductive separator between a first phase and a second phase;
a photoanode that uses one or more components of the first phase to generate cations during operation of the solar fuels generator; and
a solid cation conduit positioned such that the cations that travel along a pathway from the photoanode to the separator are conducted through the solid cation conduit.

2. The generator of claim 1, wherein the photoanode includes an oxidation catalyst in contact with the cation conduit.

3. The generator of claim 2, wherein the cation conduit contacts the oxidation catalyst and the separator.

4. The generator of claim 1, wherein:
the photoanode contacts the separator such that a length of the photoanode extends away from a first side of a separator; and
a photocathode contacts the separator such that the photocathode extends outward from a second side of the separator, the second side being opposite from the first side.

5. The generator of claim 4, wherein the cation conduit is in direct physical contact with the separator and with a side of the photoanode, and
the cation conduit being in contact with the side of the photoanode for more than 10% of the length of the photoanode.

6. The generator of claim 1, wherein the cation conduit is in direct physical contact with the separator and the photoanode.

7. The generator of claim 1, wherein the photoanode includes an oxidation catalyst between the cation conduit and a side of the photoanode such that the oxidation catalyst contacts the side and the cation conduit.

8. The generator of claim 1, wherein the photoanode is one of a plurality of photoanodes that each uses one or more components of the first phase to generate cations during operation of the solar fuels generator.

9. The generator of claim 1, wherein the cation conduit is the same material as the separator.

10. The generator of claim 1, wherein the cation conduit is the same material as the separator and the cation conduit is continuous with the separator.

11. The generator of claim 1, wherein the first phase and the second phase each contacts the separator,
the first phase is a gas that includes water vapor in contact with the photoanode, the second phase is a gas, and the photoanode uses the water vapor to generate protons during operation of the solar fuels generator.

12. The generator of claim 1, wherein the cation conduit includes a copolymer of a substituted or unsubstituted alkylene and an acid.

13. The generator of claim 12, wherein the acid is a sulfonic acid.

14. The generator of claim 1, wherein the separator conducts the cations.

15. The generator of claim 1, further comprising:
a photocathode that generates the solar fuel in the second phase, and
a second cation conduit positioned so as to conduct cations conducted through the separator from the separator to a portion of the photocathode that is spaced apart from the separator.

16. The generator of claim 15, wherein the photocathode includes a reduction catalyst between the second cation conduit and a side of the photocathode.

17. The generator of claim 15, wherein the second cation conduit is in direct physical contact with the separator and extends outward from the separator along the lateral side of the photocathode.

18. The generator of claim 1, wherein the photoanode is in the first phase and the cation conduit is arranged such that cations can travel from the photoanode to the separator without entering the first phase.

19. A solar fuels generator, comprising:
an ionically conductive separator between a first phase and a second phase;
a photocathode that uses cations generated from the first phase to generate the solar fuel in the second phase; and
a solid cation conduit positioned such that cations that travel along a pathway from the separator to the photocathode are conducted through the solid cation conduit.

20. A method of generating solar fuels, comprising:
generating a cation at a photoanode in a gaseous first phase; and
conducting the generated cation through a solid cation conduit as the cation travels along a pathway from the photoanode to an ionically conducting separator located between the first phase and a second phase.

* * * * *